United States Patent [19]
Poppinger et al.

[11] 3,818,295
[45] June 18, 1974

[54] APPARATUS AND METHOD FOR CONTROL OF SINGLE-PHASE A-C MOTORS

[75] Inventors: Herbert Poppinger, Munich; Gottfried Reger, Freising, both of Germany

[73] Assignee: Siemens Aktiengesellschaft, Munich, Germany

[22] Filed: July 12, 1972

[21] Appl. No.: 270,926

[30] Foreign Application Priority Data
July 15, 1971 Germany............................ 2135324

[52] U.S. Cl............... 318/207 B, 318/211, 318/227
[51] Int. Cl. .................................................. H02p 1/42
[58] Field of Search ........ 318/207 R, 207 A, 207 B, 318/211, 212, 227

[56] References Cited
UNITED STATES PATENTS

| | | |
|---|---|---|
| 3,183,425 | 5/1965 | Slawson............................ 318/227 |
| 3,475,669 | 10/1969 | Oltendorf............................ 318/212 |
| 3,568,019 | 3/1972 | Hirokawa et al. ............... 318/212 X |
| 3,579,064 | 5/1971 | Taylor............................ 318/227 X |

Primary Examiner—Gene Z. Rubinson
Attorney, Agent, or Firm—Kenyon & Kenyon Reilly Carr & Chapin

[57] ABSTRACT

Control apparatus for controlling the direction of rotation of an a-c motor having two stator windings with a reactance element therebetween, and for electrically braking same. The control apparatus responds to input signals to apply a-c power to the stator windings to actuate the motor to rotate in a direction dependent on the input signal present. The apparatus responds to removal of all input signals to apply d-c power simultaneously to both stator windings to brake the motor. Means are disclosed which govern the duration and magnitude of the d-c braking power. During braking, the control apparatus blocks out all spurious inputs.

15 Claims, 4 Drawing Figures

APPARATUS AND METHOD FOR CONTROL OF SINGLE-PHASE A-C MOTORS

BACKGROUND OF THE INVENTION

1. Field of the Invention

This invention relates to the field of electrical control and braking of a-c motors.

2. Discussion of the Prior Art

The invention concerns control apparatus for a single-phase a-c motor to be operated in both directions of rotation by a-c positioner circuitry. The motor to which this invention applies has two stator windings and an operational capacitor connected therebetween. Two opposed, controlled unidirectional semiconductor devices are connected in parallel to each stator winding.

Such motors are frequently used for positioning drives in the form of asynchronous motors. In order to obtain an accurate and rapid displacement in one direction or the other, fast starting and fast braking are necessary. Braking is accomplished in the prior art by additional mechanical braking devices. The required high switching frequency and duty cycle is limited by the heating of the motors, so that motors with high rotor resistance and low starting current are required. A typical duty requirement may involve more than 1,000 switching cycles per hour with a duty cycle of 20 percent and a total amount of inertia of 120 percent of the motor moment of inertia.

The mechanical braking devices are subject to heavy wear. The necessary adjustment and maintenance of such braking devices is, moreover, expensive.

It is an object of the invention to achieve in single-phase a-c motors in general, and in positioning motors in particular, reliable braking without the disadvantages of mechanical braking devices.

It is a further object of this invention to provide control means for an a-c motor which automatically, on removal of the input signals for actuating the motor to rotate, actuates means for electrically braking the motor.

It is another object of this invention to provide control means for governing the duration and power level of the electrical braking power, in order to render adjustable the currents in the motor elements to prevent overheating, while applying sufficient braking force.

Another purpose of this invention is to provide control means to suppress spurious inputs to the control circuit during braking of the motor.

Still another object of this invention is to provide efficient electrical braking of the motor regardless of its direction of rotation.

SUMMARY OF THE INVENTION

In the preferred embodiment of this invention, the positioner circuitry of the motor includes a number of unidirectional semiconductor devices, such as thyristors, each having a control terminal, being assembled in such a way that the controlled firing of the thyristors governs the currents flowing through the stator windings of an a-c motor having two stator windings.

Control circuitry is provided for firing the thyristors to render them conductive in accordance with the currents required in the windings for running and braking.

The control circuitry includes information storage devices, specifically bistable flip-flops, which are separately set by input signals, the outputs of the bistable flip-flops providing inputs to the positioner circuitry, the output of each flip-flop actuating the positioner circuitry to effect rotation of the motor in a different direction.

Additional control circuitry is provided which resets the bistable flip-flops, negating the inputs to the positioner circuitry which cause the motor to rotate, upon removal of those inputs. According to the preferred embodiment a first delay device is provided which delays the resetting of the flip-flops until a predetermined time interval has elapsed after removal of the input signals.

The resetting of the bistable flip-flops also actuates a monostable flip-flop which is part of the braking means of the control circuitry. The monostable flip-flop then remains active for a predetermined period of time, depending on the characteristics of the flip-flop, to generate a brake timing signal, which is one component signal necessary for the generation by the control circuitry of a suppression signal, which effects the electric braking.

The suppression signal actuates the unidirectional semiconductor devices to permit only d-c to flow through the two stator windings, thus effectuating braking of the motor. During braking, the suppression signal renders nonconductive those thyristors whose nonconductivity is necessary to prevent a-c from flowing through the stator windings. The suppression signal additionally causes those thyristors necessary for the passage of d-c through the stator windings to become conductive.

The suppression signal also is connected to block any input signals which may, during braking, appear on the inputs to the control circuitry.

Thus, during braking, only a pulsating d-c current is permitted to flow, and this current is directed, in phase, through both stator windings.

Means are provided to adjustably limit the duration of the d-c pulses through the windings. This renders governable the rms value of the d-c, and the braking force exerted can be limited.

DESCRIPTION OF THE PREFERRED EMBODIMENT

Figure 1:
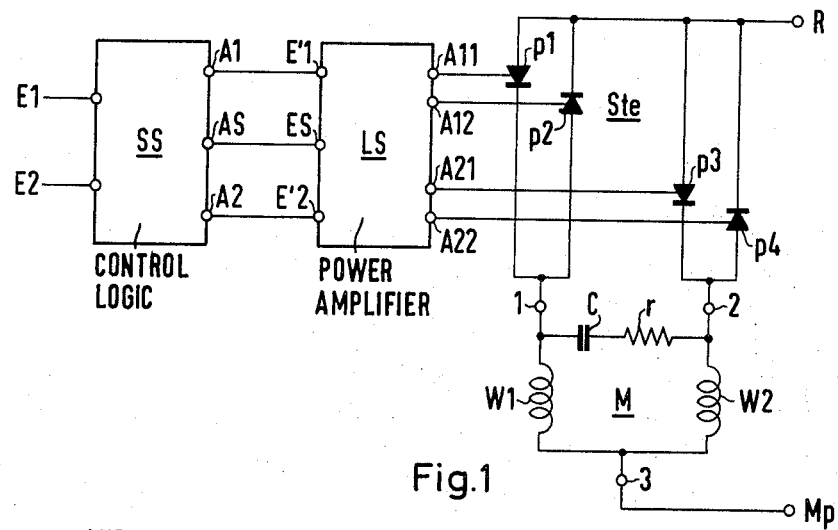
FIG. 1 is a schematic drawing of the control apparatus of this invention, partially in block form.

For operating a motor in the one or the other direction of rotation, one of the inputs E1 and E2 of a control circuit SS is fed a ONE signal, according to FIG. 1, which is passed, via the corresponding output A1 or A2, to the input E'1 or E'2, respectively, of a power stage LS and is fed on to its output side (A11, A12, A21, A22) to the positioner circuitry Ste of a single-phase a-c motor M.

Thus, the control circuit SS, in conjunction with the power stage LS which furnishes firing pulses to the thyristors p1, p2, p3 and p4 of the positioner circuit, makes possible the operation of an a-c induction motor M by directing a-c to each of the two stator windings W1, W2 in different phase relation. The windings are connected at a pair of their corresponding ends at 3 with the conductor Mp, which is connected to one terminal of the a-c power supply, and with their other ends at 1 and 2, respectively, via the two pairs of opposed parallel connected controlled thyristors p1, p2 and p3, p4, respectively, to the other terminal R of the a-c power supply. The ends of the windings 1 and 2 are mutually coupled via an operational capacitor C and a series resistor r. The thyristor pair p1, p2 makes possible operation in one direction of rotation when a-c power is impressed on terminal 1, and the thyristor pair p3, p4 enables operation in the other direction, when the a-c is applied to terminal 2.

For d-c braking the motor M independently of the instantaneous direction of rotation, two thyristors arranged in the same conduction direction, one for each stator winding, are controlled synchronously with the a-c power supply to pass current through the windings in only one direction. The other two thyristors are cut off during braking by braking suppression signals provided out of the output terminal AS to the input terminal ES of the power stage LS to effectively block the outputs A12 and A22 therefrom. Both stator windings, by way of terminals 1 and 2, are therefore fed a pulsating d-c braking current, with the number of half-waves carrying d-c braking current, and thus the braking time, being adjustable in a manner to be described below. The braking energy can also be varied by influencing the r.m.s. value of the d-c braking current, in a manner described below.

Figure 2:
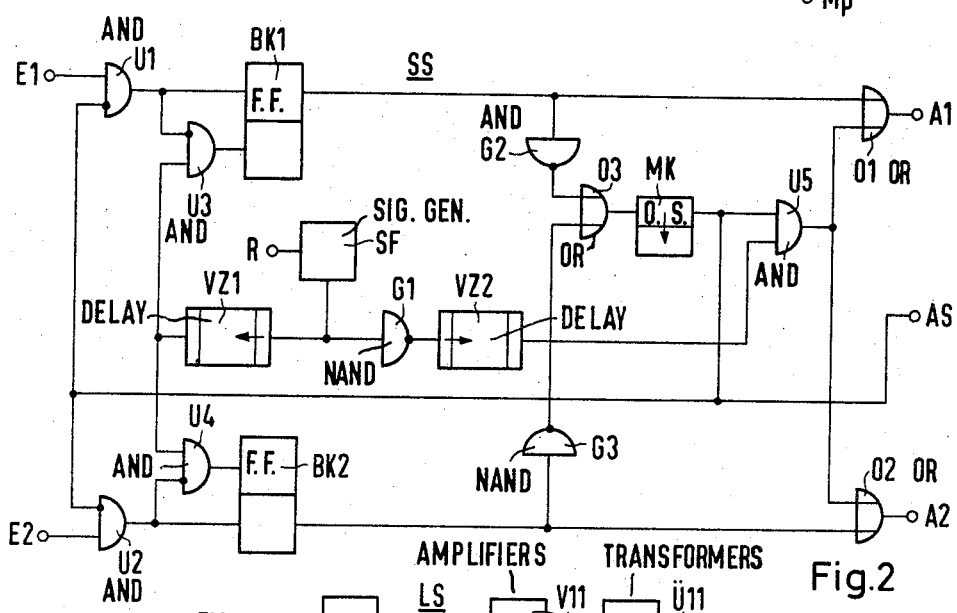
FIG. 2 is a schematic diagram of the control circuitry of this invention.

The control circuit according to FIG. 2 has two signal inputs E1, E2 and two signal outputs A1, A2, of which those with the same subscripts are associated with the same direction of motor rotation. In a manner not shown in detail, filter and threshold circuits for suppressing short-duration interference signals and for reducing the static interference susceptibility may be provided ahead of the inputs E1 and E2.

Each signal input E1, E2 is brought, via the respective AND gates U1 and U2 to the set inputs of bistable flip-flops BK1 and BK2 respectively which serve as information storage means The outputs of flip-flops BK1 and BK2 are provided respectively as inputs to OR gates 01 and and thence to one input of a different one of the OR gates 01, 02, whose outputs A1, A2 are outputs of the control circuit. The resetting input of each flipflop BK1 and BK 2 is connected with the respective output of an AND gate U3 and U4, each of which has a inverted input designated with a dot, which is connected with the output of the AND gates U1 and U2, respectively. The other two inputs of the AND gates U3 and u4 are connected to each other and to the output of a first delay member VZ1. The inverted inputs of the AND gates U1, U2 are connected with each other and to a blocking output AS from control circuit SS. The supression signal referred to above appears at the blocking output AS.

A signal generator SF, synchronized with the a-c power supply, converts the system a-c voltage U (FIG. 4a) into a square wave (FIG. 4b), which is fed, on the one hand, directly, to the input of a first delay member VZ1, and via an inverter to the input of a second delay member VZ2. The output of the second delay member VZ2, the phase control signal, is connected therefor AND gate U5. The output of a brake timer means, a monostable flip-flop MK, whose output, the brake timing signal, determines the maximum braking time of each braking cycle is the second input to AND gate U5. The output of flip-flop MK, coincident with the phase control signal, causes generation of the suppression signal used for input suppression and for proper thyristor blocking for braking. The output of AND gate U5, is connected to respective second inputs of the OR gates 01, 02. An output from AND gate U5 provides a disabling input to the OR gates 01 and 02. The outputs of the bistable flip-flops BK1 and BK2 are connected respectively through inverters G2 and G3 as the two inputs of an OR gate 03, whose output is brought to the input of th monostable flip-flop MK.

OPERATION

In the quiescent state of the control circuit SS, the inputs E1 and E2 and th outputs A1 and A2 have signals thereon which are at logic ZERO. If the motor M is operated in one direction of rotation by feeding in a logic ONE signal, for instance, to the input E1, the bistable flipflop BK1 is set so that at the output A1 of the OR gate 01, a ONE signal appears also. If the ONE signal at the input E1 is interrupted, for example, at the time t1 (FIG. 4a) initiate initiating the braking of the motor, 4a) only if combined with the reset pulse of th first delay The resulting logic ZERO signal at the output of AND gate U1, which is one input, to AND gat U3 will reset the flip flop BK 1 upon the occurrence of an output from the delay means VZ1. The reset of flip-flop BK1 causes, via the inverter G2 and the OR gate 03, the actuation of the monostable flip-flop brake timer MK, so that during the latter's adjustable flyback time (FIG. 4e, braking time being $t_{Br}$) a brake timing signal appears at the output of flip-flop MK. This brake timing signal is used as a a suppression signal to disables gates U1 and U2 to prevent signals at a logic ONE level which are provided at the terminals E1 and E2 from setting the flip flops BK1 for BK2. during the braking operation. The suppression signal is provided as the blocking output AS which is used in the logic circuitry of the power stage LS to cut off the thyristors of the positioner Ste whose conductivity would prohibit braking.

Figure 4:
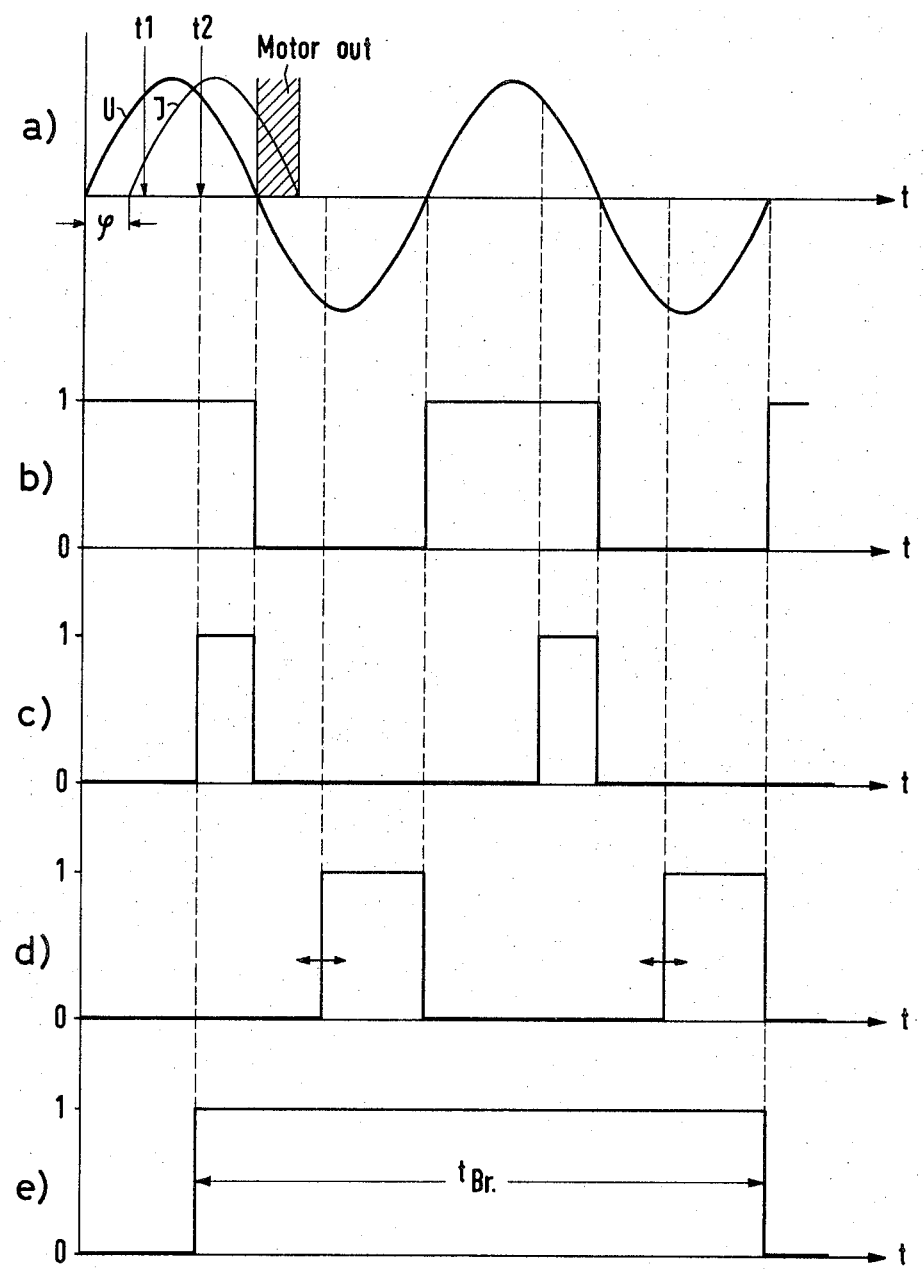
FIG. 4a is a graphic representation of the waveform of the a-c power supply output to the motor.
FIG. 4b is a graphic representation of the output of the synchronized signal generator of this invention.
FIG. 4c is a graphic representation of the output of the first delay means of this invention.
FIG. 4d is a graphic representation of the output of the second delay means of this invention.
FIG. 4e is a graphic representation of the brake timing signal of this invention.

The output of flip-flop MK is passed to one of the two inputs of AND gate U5. The other input of U5 receives a phase control signal from the second delay means VZ2. The phase control signal is in synchronism with the power supply line voltage, and is present during only a predetermined time interval within those half-cycles of line voltage during which the nonblocked thyristors can carry d-c to both windings. Although the thyristors whose conductivity would prevent d-c braking are blocked by the brake timing signal along, (the output of flip-flop MK, applied at AS), the phased control of the thyristors to carry the d-c pulses requires both the brake timing signal and phase control signal acting in concert. Coincidence of both these signals is necessary to obtain an output from AND gate U5. The duration of this output determines the period during which the two non-blocked thyristors are conductive. This renders the r.m.s. value of the d-c braking current a function of the condition of second delay means VZ2. The duration of the phase control signals of the second delay member VZ2 (FIG. 4d) can be adjusted as desired. Adjustment is also obviously possible for the delay interval between interruption of the inputs and the resetting signals of the first time delay member VZ1 (FIG. 4c).

The two time delay members VZ1 and VZ2 are controlled by the system-synchronized signal generator SF- which converts the sinusoidal line voltage (FIG. 4a) into a square-wave voltage of the same frequency (FIG. 4b), where the positive half-wave corresponds to a logic ONE signal and the negative half-wave to a logic ZERO signal. The time delay member VZ1 delays the transition from the Zero to a ONE signal (FIG. 4c at the AND gates U1 and U2), i.e., the start of the resetting signal for the respective set flip-flop BK1 or BK2. Resetting of these flip-flops triggers the monostable brake timer flip-flop MK, starting the brake period. Therefore, the motor M is disconnected at the end of the phase-shifted positive current half-wave J. The time between the interruption of the input signal at the input E1, for example, and the resetting of the flip-flop BK1 is maximally the difference between the period of the a-c line voltage and the duration of the resetting signal.

From the "inverse" square-wave voltage obtained from the inverter G1 and the delay member VZ2 which likewise delays the transition from a Zero to a ONE signal the pulses for the phase angle control signal for the braking of the motor are obtained in the manner indicated above. By varying this delay, the pulse width, and therefrom the r.m.s. value of the braking current, (d-c current), may be varied.

Figure 3:
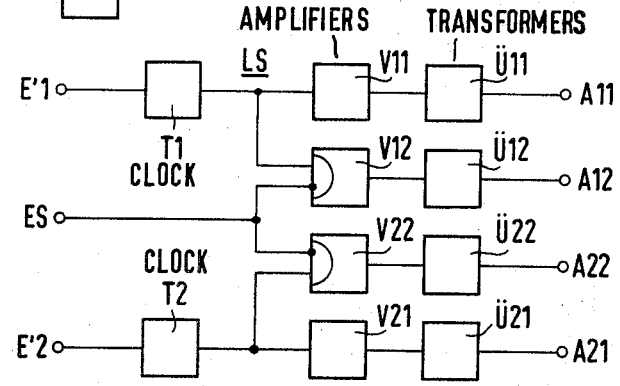
FIG. 3 is a schematic diagram of the power stage circuitry of this invention.

The signals appearing at one or both outputs A1 and A2 are fed, according to FIG. 3, to the inputs E'1 and E'2 of the power stage (or power amplification means) LS of the positioner Ste and cause one or both clock generators T1, T2 (square-wave generators) to start, which generators transmit firing pulses to th outputs A11 and A21, respectively, via the amplifiers V11 and V21 and potential-separating, interference-eliminating transformers U11 and U21, respectively. Also, by way of subordinated transformers U12 and U22, respectively, pulses are sent to the outputs A12 and A22, respectively, when no signal is present at ES. The input ES is connected to the suppression output AS, and in the presence of a blocking ONE signal on AS, blocks the corresponding thyristors $p2$, $p4$ during the braking operation via the outputs A12 and A22 so that one half-wave of the line is prevented from causing current flow in the windings. The two other thyristors $p1$, $p3$ receive simultaneously the braking firing pulses from the outputs A11 and A21 of the power stage, the r.m.s. values of these pulses being governed by the duration of the phase control signals, and the maximum time period during which such pulses can occur are limited by the brake timing signal.

In normal operation of the motor, on the other hand, either the thyristors $p1$ and $p2$ or $p3$ and $p4$, depending on the direction of rotation, receive firing pulses, rendering them conductive.

It is important to note tha if only one direction of motor rotation is required either thyristor $p2$ or $p4$ can be omitted.

It is to be understood t at the foregoing is intended to be illustrative, rather than exhaustive, of this invention, and that one of ordinary skill could modify the embodiments disclosed herein without departing from the spirit of the invention.

What is claimed is;

1. Apparatus for controlling an A-C motor having two stator windings each having a terminal on one side connected to one terminal of an A-C power supply and having respective first and second other side terminals connected through positioner circuitry to the other terminal of the A-C power supply, the motor being of a type which generates torque in one direction when A-C power is applied to the first other side terminal, the motor being electrically brakable upon delivery of D-C power to both of the first and second other side terminals, said control apparatus comprising:
   a. logic control circuitry having at least one input for receiving a first input signal and responsive thereto to provide a first output signal, said control circuitry further including means for generating a suppression signal in response to the removal of said first input signal, and
   b. power amplification means having as inputs at least said first output signal and said suppression signal and responsive to said first output signal to provide an output to said positioner circuitry to cause it to deliver A-C power to only the first other side stator terminal and responsive to said suppression signal to provide an output to said positioner circuitry to cause it to deliver D-C power simultaneously to both the first and second other side terminals of said stator, whereby the motor is caused to rotate in one direction by the presence of said first input signal, and the motor is electrically braked in response to the removal of said first input signal and delivery of D-C power simultaneously to both the stator windings.

2. The apparatus of claim 1, in which said logic control circuitry means further comprises:
   first delay means connected to said first input and being responsive to the removal of said first input signal to delay the generation of the suppression signal to deliver d-c power to both the first and second terminals only after a first predetermined time interval following the removal of said first input signal, whereby the initiation of the braking action may be delayed for a predetermined time following the removal of the first input signal from the first circuit input.

3. The apparatus of claim 2, further comprising:
   a. a synchronized signal generator connected to the a-c line voltage of the a-c power supply said generator being responsive to said line voltage to emit a first synchronized signal, in synchronism therewith, and
   b. means to pass said first synchronized signal to said first delay means, said first delay means being actuated by receipt of said first synchronized signal following removal of said first input signal to enable said braking means to generate said suppression signal only after said first predetermined time interval following receipt of said first synchronized signal.

4. The apparatus of claim 1 in which said logic control circuitry means further comprises:
braking timer means connected to said one input and being responsive to the removal of the one input signal for generating a brake timing signal of predetermined duration for providing said suppression signal for the period of said predetermined duration for actuating said positioner circuit to prevent flow of current through the windings in one direction, and which, in combination with a phase control signal, enables current flow through the windings in the other direction, whereby the maximum duration of the braking period may be governed by the characteristics of the braking timer means governing the duration of the brake timing signal.

5. The apparatus of claim 4, further comprising:
means to regulate the r.m.s. value of the d-c braking power delivered to the stator windings, whereby th level of braking power can be governed.

6. The apparatus of claim 5, in which said regulating means comprises:
a. a synchronized signal generator connectd to the a-c line voltage of the a-c power supply and responsive thereto to generate a train of second synchronized signals in synchronism with said line voltage, and
b. a second delay means connected to said synchronized signal generator and being responsive to receipt of each said second synchronized signal to generate said phase control signals, each said phase control signal having a predetermined duration, whereby d-c power is applied to the windings during periods of coincidence of said brake timing signal and said phase control signals, the duration of the brake timing signal establishing the total length of braking time and the duration of each said phase control signal regulating the value of the d-c power applied to the windings during the braking period.

7. The apparatus of claim 1, further comprising:
means to regulate the rms value of the d-c power which is deliverd to both stator windings, whereby the level of braking power can be governed.

8. The apparatus of claim 1, further comprising:
means for controlling the duration of said application of d-c power.

9. The apparatus of claim 1, in which the motor generates torque in a direction opposite to the one direction when a-c power is applied to only the second terminal said logic control circuitry comprising:
a. means to receive a second input signal,
b. means connected to said second input receiving means and responsive to the presence of said second input signal to deliver a-c power from said a-c power supply to the second terminal to cause the motor to rotate in said opposite direction, and
c. means responsive to the removal of said second input signal and connected to the positioner circuitry to actuate the positioner circuitry to provide d-c braking power to both the first and second terminals only after said second input signal is removed.

10. The apparatus of claim 2, further comprising:
means connected to said logic control circuitry and responsive to said suppression signal to block inputs at said first input signal for the duration of said suppression signal whereby any spurious input signals at said first input are blocked, so as not to interfere with braking.

11. The apparatus of claim 3, in which said control circuit means further comprises:
braking timer means connected to said first input and being responsive to the removal of the first input signal for generating a brake timing signal for providing said suppression signal for only a predetermined braking time period, whereby the maximum duration of the braking period may be governed by he condition of the braking timer means governing the duration of the brake timing signal.

12. The apparatus of claim 2, further comprising:
braking timer means connected to said first input and being responsive to the removal of the first input signal for generating a brake timing signal for enabling, in combination with a phase control signal, the generation of said suppression signal for only a predetermined braking time period.

13. The apparatus of claim 1 in which the positioner circuitry comprises:
a. a pair of first and second unidirectional devices connected in opposite directions in parallel between said other terminal of the a-c power supply and the first terminal, the conductive direction of said first unidirectional device being toward said first terminal, and
b. a third unidirectional device connected between said other terminal of said a-c power supply and said second terminal and having its conductive direction toward said second terminal, each of said unidirectional devices having a control terminal, the potential on which determining whether its associated unidirectional device is conductive in its direction of conduction, or is nonconductive, said control terminals being connected to said power amplification means to render said unidirectional devices controllable by said control ciuit means in order to control the delivery of power to the first and second terminals, whereby a-c power to rotate the motor may be applied to said first terminal by rendering conductive only said first and second unidirectional devices, and d-c braking power may be applied to both terminals by rendering conductive only said first and third unidirectional devices.

14. The apparatus of claim 13, in which said power amplification means comprises:
a. clock generator means responsive to said first input to apply potential to said control terminals of only said first and third unidirectional devices, to render them conductive, and
b. logic gate means responsive to said suppression signal to block said second unidirectional device.

15. The apparatus of claim 14, further comprising:
amplifier means to amplify the signals emitted by said clock generator.

* * * * *